United States Patent
Oishi et al.

(10) Patent No.: US 6,988,515 B2
(45) Date of Patent: Jan. 24, 2006

(54) ULTRA-LOW PERMEATION HOSE AND METHOD OF MANUFACTURE

(75) Inventors: Hideyuki Oishi, Kanagawa (JP); Yuuji Kawamori, Kanagawa (JP); Hiroaki Shibano, Kanagawa (JP); Fumio Tashiro, Shiga (JP)

(73) Assignees: The Yokohama Rubber Co., Ltd., Tokyo (JP); Nihon Matai Co., Ltd., Tokyo (JP)

( * ) Notice: Subject to any disclaimer, the term of this patent is extended or adjusted under 35 U.S.C. 154(b) by 147 days.

(21) Appl. No.: 10/650,966

(22) Filed: Aug. 29, 2003

(65) Prior Publication Data

US 2004/0040609 A1 Mar. 4, 2004

(30) Foreign Application Priority Data

Aug. 30, 2002 (JP) .............................. 2002-255099

(51) Int. Cl.
*F16L 11/04* (2006.01)
(52) U.S. Cl. ...................... 138/143; 138/141; 138/138; 138/127; 138/137
(58) Field of Classification Search ............... 138/143, 138/141, 137, 138, 127, 140
See application file for complete search history.

(56) References Cited

U.S. PATENT DOCUMENTS

| | | | | |
|---|---|---|---|---|
| 3,614,967 A | * | 10/1971 | Royston ..................... | 138/141 |
| 3,616,963 A | | 11/1971 | Sinnott ....................... | 220/678 |
| 4,510,974 A | * | 4/1985 | Natori et al. ............... | 138/137 |
| 4,517,340 A | | 5/1985 | Read et al. ................. | 525/113 |
| 5,476,121 A | * | 12/1995 | Yoshikawa et al. ......... | 138/138 |
| 5,488,975 A | * | 2/1996 | Chiles et al. ............... | 138/125 |
| 5,718,956 A | * | 2/1998 | Gladfelter et al. ......... | 428/35.9 |
| 6,074,717 A | * | 6/2000 | Little et al. ................ | 428/35.7 |
| 6,179,008 B1 | * | 1/2001 | Kawazura et al. .......... | 138/125 |
| 6,213,156 B1 | * | 4/2001 | Niki et al. .................. | 138/126 |
| 6,328,075 B1 | * | 12/2001 | Furuta et al. ............... | 138/143 |
| 6,390,140 B2 | * | 5/2002 | Niki et al. .................. | 138/127 |
| 6,648,023 B2 | | 11/2003 | Nakakita et al. ............ | 138/127 |
| 2002/0056481 A1 | | 5/2002 | Nakakita et al. ............ | 138/127 |

FOREIGN PATENT DOCUMENTS

EP 0 882 572 A1 12/1998
JP 2001-165358 6/2001

* cited by examiner

*Primary Examiner*—Patrick Brinson
(74) *Attorney, Agent, or Firm*—Finnegan, Henderson, Farabow, Garrett, & Dunner, L.L.P.

(57) ABSTRACT

An object of the present invention is to provide ultra-low permeation hoses which have at the interior thereof a refrigerant barrier layer that consists in large part of a metal layer and is capable of conforming to hose deformation, which have an excellent resistance to refrigerant permeation (i.e., barrier properties to refrigerants), particularly an excellent $CO_2$ permeation resistance and an excellent heat resistance when $CO_2$ is used as the refrigerant. The object can be accomplished by an ultra-low permeation hose having at least a refrigerant barrier layer and a rubber layer and/or a resin layer; wherein the refrigerant barrier layer is a laminated film comprising a resin layer and, on the outside thereof, a metal layer, which the resin layer and the metal layer are bonded together by a polyamide-epoxy reactive adhesive.

12 Claims, 1 Drawing Sheet

ULTRA-LOW PERMEATION HOSE AND METHOD OF MANUFACTURE

BACKGROUND OF THE PRESENT INVENTION

1. Field of the Present Invention

The present invention relates to ultra-low permeation hoses and to a method of manufacture thereof. The present invention relates in particular to ultra-low permeation hoses having an increased resistance to permeation by such substances as refrigerants, fuel gases and flame cutting gases, and also having heat resistance and resistance to carbon dioxide permeation (referred to hereinafter as "$CO_2$ permeation resistance"), as well as to a method of manufacturing such hoses.

2. Description of the Related Art

The hoses used for carrying refrigerant in automotive air conditioning units and similar applications generally have an inner tube that includes polyamide resin or modified butyl rubber as a refrigerant barrier layer. The refrigerant used until now has been the hydrofluorocarbon R134a, but R134a has a global warming potential (GWP) relative to $CO_2$ of about 3,100, which represents a major problem. Reducing the leakage of refrigerant from hoses to a level as close to zero as possible has become an important goal for preserving the global environment.

To address this challenge, technology is being developed that enhances the low permeability of refrigerant-carrying hoses by employing a metal vapor-deposited film as the refrigerant barrier layer. For example, JP 2-209224 A describes a low-permeation rubber hose in which a thin film made of a specific metal is formed by a sputtering or ion plating process on the outer peripheral surface of a synthetic resin inner tube. JP 2-209225 A describes a low-permeation rubber hose in which a dry-plated thin film of a metal or a metal compound is formed on the outer peripheral surface of a synthetic resin inner tube.

Rubber hoses which use a metal foil as the refrigerant barrier layer so as to maintain low refrigerant permeability even when the hose is deformed have also been proposed in the art. For example, JP 2-80881 A describes a flexible hose of low permeability to hydrofluorocarbon which includes a laminated film composed of metal foil and plastic film as the barrier layer.

Because R134a has a GWP relative to $CO_2$ of about 3,100, there has been much interest lately in replacing R134a with $CO_2$ as the next generation of refrigerants. However, when $CO_2$ is employed as a refrigerant, the $CO_2$ must be used in the system in a supercritical state (referred also to hereinafter as "supercritical $CO_2$"), thus requiring hoses to have greater heat resistance and $CO_2$ permeation resistance. Employing $CO_2$ as a refrigerant will most likely entail using it in a gaseous state, a liquid state, a solid state and a supercritical state.

In the low-permeation rubber hoses described in JP 2-209224 A and JP 2-209225 A, forming a metal vapor-deposited film enhances the low permeability properties of the refrigerant barrier layer. However, because the metal vapor-deposited film is very thin, it is unable to conform to the rubber hose as the hose undergoes large deformation during use. As a result, pinholes and cracks arise in the metal vapor-deposited film, allowing the refrigerant to leak out. Such hoses are particularly unsuitable as ultra-low permeation hoses when $CO_2$ is the refrigerant.

When the laminated film composed of metal foil and plastic film described in JP 2-80881 A is used, deformation of the rubber hose causes the metal foil to rupture, making it impossible to maintain a low permeability to refrigerants. Moreover, JP 2-80881 A fails to specifically mention a method for bonding the metal foil with the plastic film, the bonding of which is generally difficult, or a method for bonding the nylon tubing serving as the inner layer of the hose with the barrier layer.

JP 2001-165358 A describes a hose of low permeability to refrigerants or the like which has at the interior a refrigerant barrier layer that consists in large part of a metal layer and is capable of conforming to deformation of the hose, as well as a method for manufacturing such a hose. However, the adhesive layer in a metal (aluminum)-strength-retaining layer (nylon) construction bonded using an aromatic polyester adhesive ultimately fails when exposed to supercritical $CO_2$.

A need has thus been felt for ultra-low permeation hoses which are fully capable of withstanding deformation of the rubber hose, have an excellent resistance to permeability by substances such as refrigerants, and in particular have a better heat resistance and $CO_2$ permeation resistance when $CO_2$ is used as the refrigerant. There has also been a need for a concrete method of manufacturing such hoses.

SUMMARY OF THE PRESENT INVENTION

It is therefore one object of the present invention to provide ultra-low permeation hoses which have at the interior thereof a refrigerant barrier layer that consists in large part of a metal layer and is capable of conforming to hose deformation, which have an excellent resistance to refrigerant permeation (i.e., barrier properties to refrigerants), particularly an excellent $CO_2$ permeation resistance and an excellent heat resistance when $CO_2$ is used as the refrigerant. Another object of the present invention is to provide a method for manufacturing such hoses.

We have discovered that hoses in which a polyamide-epoxy reactive adhesive is used for bonding in the above-mentioned metal (aluminum)-strength-retaining layer (nylon) construction have better low permeation properties to refrigerants and various gases, are capable of maintaining a low permeability even when the hose is deformed, and moreover have an excellent $CO_2$ permeation resistance and heat resistance when $CO_2$ is used as the refrigerant.

Accordingly, the present invention provides the following ultra-low permeation hoses and methods for manufacturing such hoses.

(1) An ultra-low permeation hose having at least a refrigerant barrier layer and a rubber layer and/or a resin layer; wherein the refrigerant barrier layer is a laminated film comprising a resin layer and, on the outside thereof, a metal layer, which the resin layer and the metal layer are bonded together by a polyamide-epoxy reactive adhesive.

(2) An ultra-low permeation hose having at least a refrigerant barrier layer and a rubber layer and/or a resin layer; wherein the refrigerant barrier layer is a laminated film composed of at least a metal layer laminated between two resin layers, and at least the inside resin layer of the two resin layers is bonded with the metal layer by a polyamide-epoxy reactive adhesive.

(3) The ultra-low permeation hose of (1) or (2) above, wherein the laminated film has an elongation at break of at least 10%.

(4) The ultra-low permeation hose of any one of (1) to (3) above, wherein the metal layer is a metal foil.

(5) The ultra-low permeation hose of any one of (1) to (4), wherein the resin layer has a strength-retaining layer.

(6) The ultra-low permeation hose of (5) above, wherein the strength-retaining layer is made of a polyamide resin composition, a polyester resin composition, a polyvinyl alcohol resin composition, a polyimide resin composition or a fluorocarbon resin composition.

(7) The ultra-low permeation hose of (5) or (6) above, wherein the strength-retaining layer is the innermost resin layer, and the strength-retaining layer and the metal layer are bonded together by a polyamide-epoxy reactive adhesive.

(8) A method of manufacturing an ultra-low permeation hose having at least a refrigerant barrier layer, a rubber layer and/or a resin layer, and an adhesive layer for bonding therebetween, wherein the refrigerant barrier layer comprising a resin layer and, on the outside thereof, a metal layer, the resin layer and the metal layer being bonded together by a polyamide-epoxy reactive adhesive, which method includes:

a lamination step in which the rubber layer and/or the resin layer, the adhesive layer and the refrigerant barrier layer are laminated together; and a vulcanization and bonding step in which the laminated rubber layer and/or resin layer, adhesive layer and refrigerant barrier layer are heated to at least a temperature at which the adhesive in the adhesive layer reacts and vulcanization and/or reaction of the rubber layer and/or the resin layer is effected, inducing bonding between the refrigerant barrier layer and the rubber layer and/or the resin layer.

(9) A method of manufacturing an ultra-low permeation hose having at least a refrigerant barrier layer and a rubber layer and/or a resin layer, wherein the refrigerant barrier layer comprising a resin layer and, on the outside thereof, a metal layer, the resin layer and the metal layer being bonded together by a polyamide-epoxy reactive adhesive, and wherein the refrigerant barrier layer includes an adhesive layer as a surface-forming resin layer, which method includes:

a lamination step in which the rubber layer and/or the resin layer and the refrigerant barrier layer are laminated together; and a vulcanization and bonding step in which the laminated rubber layer and/or resin layer and refrigerant barrier layer are heated to at least a temperature at which the adhesive in the adhesive layer reacts and vulcanization and/or reaction of the rubber layer and/or the resin layer is effected, inducing bonding between the refrigerant barrier layer and the rubber layer and/or the resin layer.

(10) A method of manufacturing an ultra-low permeation hose having at least a refrigerant barrier layer, a rubber layer and/or a resin layer, and an adhesive layer for bonding therebetween, wherein the refrigerant barrier layer is composed of at least a metal layer laminated between two resin layers, at least the inside resin layer of the two resin layers being bonded with the metal layer by a polyamide-epoxy reactive adhesive, which method includes:

a lamination step in which the rubber layer and/or the resin layer, the adhesive layer and the refrigerant barrier layer are laminated together; and a vulcanization and bonding step in which the laminated rubber layer and/or resin layer, adhesive layer and refrigerant barrier layer are heated to at least a temperature at which the adhesive in the adhesive layer reacts and vulcanization and/or reaction of the rubber layer and/or the resin layer is effected, inducing bonding between the refrigerant barrier layer and the rubber layer and/or the resin layer.

(11) A method of manufacturing an ultra-low permeation hose having at least a refrigerant barrier layer and a rubber layer and/or a resin layer, wherein the refrigerant barrier layer is composed of at least a metal layer laminated between two resin layers, at least the inside resin layer of the two resin layers being bonded with the metal layer by a polyamide-epoxy reactive adhesive, and wherein the refrigerant barrier layer includes an adhesive layer as a surface-forming resin layer, which method includes:

a lamination step in which the rubber layer and/or the resin layer and the refrigerant barrier layer are laminated together; and a vulcanization and bonding step in which the laminated rubber layer and/or resin layer and refrigerant barrier layer are heated to at least a temperature at which the adhesive in the adhesive layer reacts and vulcanization and/or reaction of the rubber layer and/or the resin layer is effected, inducing bonding between the refrigerant barrier layer and the rubber layer and/or the resin layer.

As described below, ultra-low permeation hoses according to the present invention have an excellent resistance to refrigerant permeation, heat resistance and adhesion, and a particularly outstanding heat resistance and $CO_2$ permeation resistance when $CO_2$ is used as the refrigerant. Accordingly, they lend themselves well to use as hoses for carrying various types of refrigerants, and are particularly well-suited to use as refrigerant-carrying hoses in automotive air conditioners.

The inventive method of manufacturing ultra-low permeation hoses provides a highly beneficial way to produce the ultra-low permeation hoses of the present invention.

DETAILED DESCRIPTION

Figure 1:
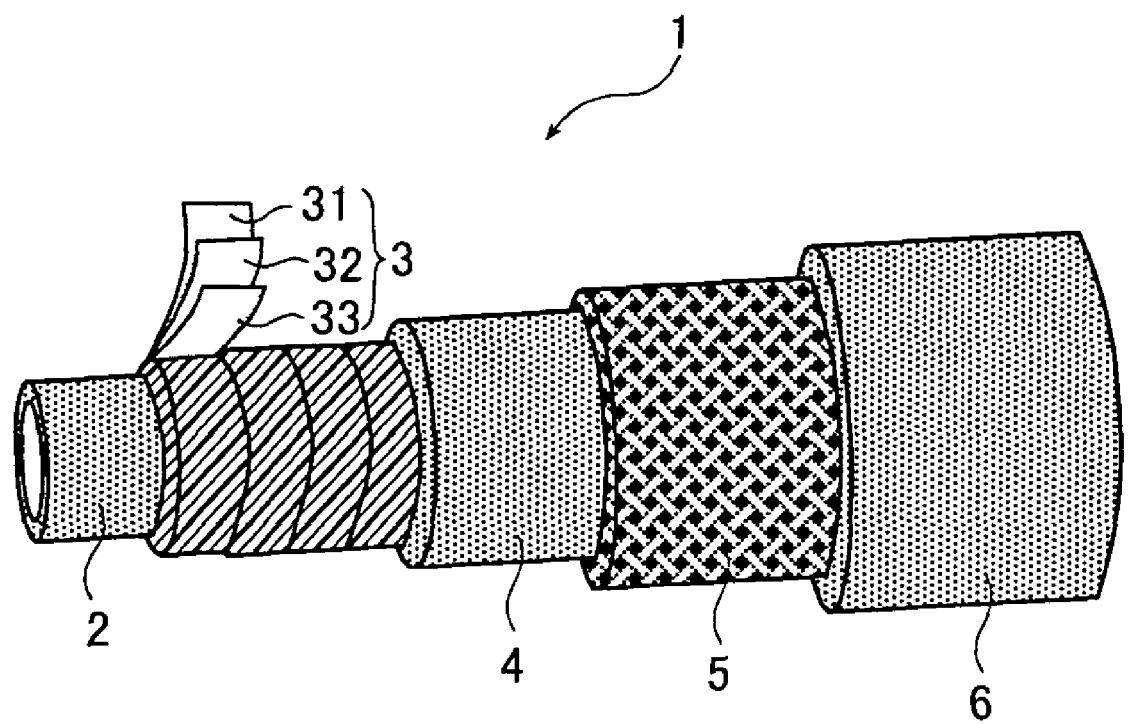
FIG. 1 is a perspective view showing an embodiment of the ultra-low permeation hose according to the present invention.

The present invention is described more fully below.

The ultra-low permeation hose of the present invention comprises at least a refrigerant barrier layer and a rubber layer and/or a resin layer. The refrigerant barrier layer is a laminated film comprising a resin layer and, on the outside thereof, a metal layer, with the resin layer and the metal layer being bonded together by a polyamide-epoxy reactive adhesive.

Refrigerant Barrier Layer

The refrigerant barrier layer in the ultra-low permeation hose of the present invention is a laminated film having a resin layer and, on the outside thereof, a metal layer. Preferably, it is a laminated film in which the metal layer is sandwiched between two resin layers.

Examples of metals of which the metal layer may be made include one or mixtures of two or more of the following: aluminum, copper, silver, gold, cobalt, iron, tin, nickel, lead, and zinc. Of these, the use of aluminum is preferred because of its excellent malleability, ductility and versatility.

The metal layer is preferably a metal foil. For good resistance to refrigerant permeation and to minimize vibration transmissibility, it is preferable for the metal foil to have a thickness of 0.1 to 100 $\mu$m, and especially 1 to 30 $\mu$m.

The resin layer may consist of one layer or of two or more layers. In cases where the refrigerant barrier layer is a laminated film composed of the metal layer sandwiched between two resin layers, the resin layer on each side of the metal layer may itself consist of one layer or of two or more layers. The resins within the resin compositions making up the two resin layers in the refrigerant barrier layer may be the same or different. "Resin composition," as used herein, refers to a composition which includes a resin and may, if necessary, include additives.

The resin included within the resin composition making up the resin layer is not subject to any particular limitation insofar as it is a resin conducive to the objects of the present invention. The use of a resin having excellent strength at break and elongation at break or of a resin capable of bonding with other layers such as another rubber layer or a resin layer during hose production is preferred. Examples of suitable resins include polyamide resins and polyester resins.

Moreover, to increase the strength at break of the laminated film and strengthen the bond with the metal layer, it is preferable for the resin layer (at least one of the two resin layers in cases where the laminated film is composed of a metal layer sandwiched between two resin layers) to comprise a strength-retaining layer which has a good adhesion to the metal layer and is capable of retaining strength.

Providing a strength-retaining layer enables the elongation at break which is one of the features of the laminated film used in the present invention to be even further enhanced.

The resin composition making up the strength-retaining layer preferably includes one or more resin having excellent strength at break and elongation at break, such as polyamide resins, polyester resins, polyvinyl alcohol resins, polyimide resins and fluorocarbon resins. Of these, the use in the strength-retaining layer of a resin composition containing a polyamide resin is preferred because of the particularly outstanding strength at break and elongation at break of polyamide resins.

Examples of polyamide resins include nylon 46, nylon 6, nylon 66, nylon 610, nylon 611, nylon 612, nylon 11, nylon 12, nylon 666, nylon MXD6, nylon 6T, nylon 6/66 copolymers, nylon 6/66/610 copolymers, nylon 6/6T copolymers, nylon 66/PP copolymers and nylon 66/PPS copolymers. Of these, nylon 6, nylon 66, nylon 666 and copolymers thereof are preferred. These polyamide resins may be used alone, as combinations of two or more thereof, or together with other resins.

Examples of polyester resins include polyethylene terephthalate, polybutylene terephthalate and polyethylene naphthalate. The use of polyethylene terephthalate is preferred.

Additives that may be used in the resin composition include vulcanizing agents, fillers, reinforcements, plasticizers, antioxidants, accelerators, softeners, tackifiers, lubricants, dispersants and processing aids. These additives can be selected as appropriate for the type of resin to be used in the resin layer.

In cases where the ultra-low permeation hoses of the present invention are used in applications that require in particular heat resistance, such as hoses for carrying $CO_2$ refrigerant, if the outermost resin layer and innermost resin layer within the refrigerant barrier layer are bonded to the rubber layer and/or resin layer by heat welding, adhesion between the outermost resin layer and the rubber layer and/or resin layer may weaken during use of the hose. Therefore, it is preferable for the inventive ultra-low permeation hose to be provided with an adhesive layer, rather than having heat-weldable (capable of melting under the application of heat and bonding with the rubber layer and/or resin layer) resin layers as the outermost resin layer and the innermost resin layer.

The adhesive which forms the adhesive layer may be any adhesive capable of bonding a resin with a rubber or resin. Specific examples of adhesives include phenolic-type resins such as halogenated phenolic resins, phenolic resins, resorcinol resins and cresol resins.

Therefore, the laminated film used in the ultra-low permeation hose of the present invention has at least a three-layer structure (resin layer/metal layer/resin layer), but may have a four-layer structure (outermost resin layer/strength-retaining layer/metal layer/innermost resin layer or outermost resin layer/metal layer/strength-retaining layer/innermost resin layer) or a five-layer structure (outermost resin layer/strength-retaining layer/metal layer/strength-retaining layer/innermost resin layer).

Because the laminated film used as the refrigerant barrier layer in the ultra-low permeation hose of the present invention has a structure in which a resin layer is laminated on one or both sides of the metal layer, the metal layer is capable of stretching to conform with the resin layer. Hence, unlike when a metal layer is used alone as the refrigerant barrier layer, the laminated film has an excellent elongation at break.

Specifically, in the ultra-low permeation hose according to the present invention, the laminated film used as the refrigerant barrier layer has an elongation at break of preferably at least 10%, and more preferably at least 20%. An elongation at break within this range is desirable because hose deformation and outside influences such as vibration do not result in cracking.

The laminated film has a thickness of preferably 1 to 500 $\mu$m, and more preferably 5 to 200 $\mu$m. A thickness within this range is desirable because conformity of the laminated film to the hose can be ensured while maintaining the resistance of the film to refrigerant permeation.

Therefore, the laminated film used as the refrigerated barrier layer in the ultra-low permeation hose of the present invention is a film having a structure composed of at least a metal layer laminated between two resin layers, and at least the inside resin layer of the two resin layers is bonded to the metal layer by a polyamide-epoxy reactive adhesive. The film has an elongation at break of preferably at least 10%, and most preferably at least 20%.

Generally, in hoses having a metal layer for preventing the permeation of a refrigerant or gas, the refrigerant or gas that has been prevented from passing from the interior to the exterior of the hose collects near the interface between the metal layer and a layer on the inside thereof.

In the hose described in JP 2001-165358 A, a metal layer and a resin layer on the inside thereof are bonded together by an aromatic polyester adhesive. However, this adhesive fails under exposure to supercritical $CO_2$ which collects near the interface between the two layers, resulting in separation of the layers at the interface. Hence, $CO_2$ cannot be used as a refrigerant in such hoses.

By contrast, in the ultra-low permeation hose of the present invention, the resin layer and the metal layer are bonded together by a polyamide-epoxy reactive adhesive. Because this adhesive has excellent heat resistance and resistance to permeation by $CO_2$ in a supercritical state (referred to hereinafter as "supercritical $CO_2$ permeation resistance"), separation at the interface between the two layers does not occur.

Bonding between the resin layer and the metal layer is carried out by applying a polyamide-epoxy reactive adhesive having the above-described excellent refrigerant permeation resistance, heat resistance and supercritical $CO_2$ permeation resistance to the bonding surface of the resin layer and/or the metal layer.

"Polyamide-epoxy reactive adhesive," as used herein, refers to a flexible modified epoxy-based adhesive composed of an alcohol-soluble polyamide resin and a polyfunctional epoxy resin. A specific example of such an adhesive is ARON MIGHTY BX-60 (produced by Toagosei Co., Ltd.), which is used in the subsequently described examples.

In cases where the laminated film is composed of a metal layer sandwiched between two resin layers, bonding between the outside resin layer of the two resin layers and the metal layer may be carried out by applying a suitable known adhesive such as a polyester adhesive or polyurethane adhesive, or by applying a polyamide-epoxy reactive adhesive as for the above-described bonding between the inside resin layer and the metal layer, to the bonding surface of the outside resin layer and/or the metal layer. Alternatively, bonding may be effected by a method in which the outside resin layer of the above two resin layers is laminated with the metal layer and the laminate is rolled to a predetermined thickness with pressure rolls, or by a lamination method in which the metal layer is vapor-deposited onto the outside resin layer of the above two resin layers.

Therefore, in cases where the laminated film used in the present invention is a laminated film composed of a metal layer sandwiched between two resin layers, it is desirable for the laminated film to be the refrigerant barrier layer in which the innermost layer of the inside resin layer of the above two resin layers is a strength-retaining layer, and this strength-retaining layer is bonded with the metal layer by a polyamide-epoxy reactive adhesive.

Ultra-Low Permeation Hose

Next, the construction of the ultra-low permeation hose of the present invention is described.

The ultra-low permeation hose of the present invention has a layer construction which includes at least the above-described refrigerant barrier layer and a rubber layer and/or a resin layer. For example, the hose may be one which has the above-described type of refrigerant barrier layer and a rubber layer and/or a resin layer, and is composed of an inner tube, a reinforcing layer and an outer tube.

In this case, the respective tubes and the reinforcing layer may each be made of one layer or a plurality of layers, and the refrigerant barrier layer may serve as part of the inner tube or outer tube or may itself be the inner tube or outer tube.

Referring to FIG. 1, which is a perspective view of a preferred embodiment of the ultra-low permeation hose of the present invention in which each layer of the hose is shown cut away, the hose 1 has an inner tube composed of an innermost layer 2, a refrigerant barrier layer 3 made of a laminated film, and an inner tube outer layer 4. The inner tube is covered by a reinforcing layer 5, which is in turn covered by an outer tube 6. The refrigerant barrier layer 3 has a first resin layer 31, a metal layer 32, and a second resin layer 33.

The inner tube may, as shown in FIG. 1, have a three-layer construction composed of the refrigerant barrier layer 3 sandwiched between the innermost layer 2 and the inner tube outer layer 4. Alternatively, the inner tube may have a two-layer construction composed of an innermost layer and a refrigerant barrier layer, or a two-layer construction composed of a refrigerant barrier layer and an inner tube outer layer. It is also possible to provide the refrigerant barrier layer in the outer tube 6, in which case the outer tube 6 may have a multilayer construction of which the refrigerant barrier layer is a part.

Illustrative examples of substances of which the inner tube may be made include rubber compositions such as acrylonitrile-butadiene rubber (NBR), butyl rubber (IIR), ethylene-propylene-diene rubber (EPDM), hydrogenated NBR (HNBR), chloroprene rubber (CR), chlorosulfonated methyl polyethylene (CSM), chlorinated polyethylene (CM), brominated butyl rubber (BIIR), chlorinated butyl rubber (CIIR), and halogenated copolymer rubbers of isomonoolefins and p-alkylstyrenes (BIMS); and thermoplastic resin compositions such as polyamide resins, polyester resins, polyolefin resins and EPDM/PP thermoplastic resin compositions. Of these, the use of IIR, EPDM, HNBR, polyamide resins and polyester resins is preferred because these substances undergo minimal swell and have a good heat resistance when exposed to supercritical $CO_2$.

The reinforcing layer is not subject to any particular limitation in its configuration, and may be formed, for example, in a braided or spiral arrangement. Examples of materials that may be used in the reinforcing layer include organic fibers and metal fibers.

No particular limitation is imposed on the material of which the reinforcing layer is made. However, given the properties required of the reinforcing layer, suitable fibrous materials include vinylon fibers, rayon fibers, polyester fibers, aromatic polyamide fibers, polyarylate fibers, PBO (poly(p-phenylene benzobisoxazole)) fibers and polyketone fibers; and suitable metal materials include hard steel wire and, more specifically, brass-plated wire or zinc-plated wire commonly used to prevent rust and impart adhesive properties.

Illustrative examples of the substances making up the outer tube include rubber compositions of NBR, IIR, EPDM, HNBR, CR, CSM and CM; and thermoplastic resin compositions of polyamide resins and polyester resins.

In cases where the outer tube is composed in part of the above-described refrigerant barrier layer, the other layer of the outer tube is preferably made of a rubber composition or thermoplastic resin composition having excellent adhesion with the resin layer that forms the surface of the refrigerant barrier layer. Preferred examples include compositions containing CR, EPDM, CSM, CM, CIIR, BIIR, BIMS or IIR.

Method of Manufacturing the Ultra-Low Permeation Hose

The manufacturing method according to one aspect of the present invention (referred to hereinafter as the "first manufacturing method") is a method of manufacturing an ultra-low permeation hose having at least a refrigerant barrier layer, a rubber layer and/or a resin layer, and an adhesive layer for bonding therebetween, wherein the refrigerant barrier layer comprising a resin layer and, on the outside thereof, a metal layer, the resin layer and the metal layer being bonded together by a polyamide-epoxy reactive adhesive, which method includes:

a lamination step in which the rubber layer and/or the resin layer, the adhesive layer and the refrigerant barrier layer are laminated together; and a vulcanization and bonding step in which the laminated rubber layer and/or resin layer, adhesive layer and refrigerant barrier layer are heated to at least a temperature at which the adhesive in the adhesive layer reacts and vulcanization and/or reaction of the rubber layer and/or the resin layer is effected, inducing bonding between the refrigerant barrier layer and the rubber layer and/or the resin layer.

In another embodiment, the first manufacturing method of the present invention is a method of manufacturing an ultra-low permeation hose having at least a refrigerant barrier layer, a rubber layer and/or a resin layer, and an adhesive layer for bonding therebetween, wherein the refrigerant barrier layer is composed of at least a metal layer laminated between two resin layers, at least the inside resin layer of the two resin layers being bonded with the metal layer by a polyamide-epoxy reactive adhesive, which method includes:

a lamination step in which the rubber layer and/or the resin layer, the adhesive layer and the refrigerant barrier layer are laminated together; and a vulcanization and bonding step in which the laminated rubber layer and/or resin layer, adhesive layer and refrigerant barrier layer are heated to at least a temperature at which the adhesive in the adhesive layer reacts and vulcanization and/or reaction of the rubber layer and/or the resin layer is effected, inducing bonding between the refrigerant barrier layer and the rubber layer and/or the resin layer.

Another aspect of the present invention (referred to hereinafter as the "second manufacturing method") provides a method for producing an ultra-low permeation hose in which the above-mentioned refrigerant barrier layer includes an adhesive layer as a surface-forming resin layer, which method includes:

a lamination step in which the rubber layer and/or the resin layer and the refrigerant barrier layer are laminated together; and a vulcanization and bonding step in which the laminated rubber layer and/or resin layer and refrigerant barrier layer are heated to at least a temperature at which the adhesive in the adhesive layer reacts and vulcanization and/or reaction of the rubber layer and/or the resin layer is effected, inducing bonding between the refrigerant barrier layer and the rubber layer and/or the resin layer.

As noted above, the refrigerant barrier layer in the ultra-low permeation hose is a laminated film having a resin layer and, on the outside thereof, a metal layer. Preferably, it is a laminated film composed of at least a metal layer laminated between two resin layers, at least the inside resin layer of the two resin layers being bonded with the metal layer by a polyamide-epoxy reactive adhesive. The refrigerant barrier layer has an elongation at break of preferably at least 10%, and more preferably at least 20%.

Laminated films that may be used in the inventive method include those having a three-layer structure (resin layer/metal layer/resin layer), a four-layer structure (outermost resin layer/strength-retaining layer/metal layer/innermost resin layer or outermost resin layer/metal layer/strength-retaining layer/innermost resin layer) or a five-layer structure (outermost resin layer/strength-retaining layer/metal layer/strength-retaining layer/innermost resin layer) which are mentioned above as examples of laminated films suitable for use in the ultra-low permeation hose of the present invention. An adhesive layer may be used as the outermost resin layer that forms the surface of the refrigerant barrier layer.

The rubber layer may be made of any of the rubber compositions mentioned above as examples of rubber compositions suitable for use in the ultra-low permeation hose of the present invention. Likewise, the resin layer may be made of any of the resin compositions mentioned above as examples of resin compositions suitable for use in the ultra-low permeation hose of the present invention.

In addition, the adhesive layer may be made of any of the adhesives mentioned above as examples of adhesives capable of bonding the foregoing resin with rubber or resin.

Accordingly, the first manufacturing method of the present invention is preferably a method of manufacturing ultra-low permeation hose which includes a lamination step in which the rubber layer and/or the resin layer, the adhesive layer and the refrigerant barrier layer (laminated film) are laminated together; and a vulcanization and bonding step in which the laminated rubber layer and/or resin layer, adhesive layer and refrigerant barrier layer are heated to at least a temperature at which the adhesive in the adhesive layer reacts and vulcanization and/or reaction of the rubber layer and/or the resin layer is effected, thereby causing the refrigerant barrier layer to bond with the rubber layer and/or the resin layer.

The above lamination step may involve, for example, laminating together the rubber layer and/or resin layer, the adhesive layer and the resin layer serving as a part of the refrigerant barrier layer by first laminating the adhesive layer onto the rubber layer and/or resin layer serving as the innermost layer of the hose, then spirally or axially winding the laminated film onto the adhesive layer.

This lamination step may include also, following lamination of the rubber layer and/or resin layer, the adhesive layer and the resin layer serving as a part of the refrigerant barrier layer, respective steps in which an inner tube outer layer is formed, a rubber composition is optionally extruded, a reinforcing layer is formed from a plurality of organic fibers or metal fibers in a parallel arrangement—either by spirally winding them or by braiding them together, and an outer tube is formed by extrusion.

In the vulcanization and bonding step, the rubber layer and/or resin layer, the adhesive layer and the refrigerant barrier layer that have been laminated together are heated to at least a temperature at which the adhesive in the adhesive layer reacts and vulcanization and/or reaction of the rubber layer and/or resin layer is effected, thereby causing the refrigerant barrier layer to bond with the rubber layer and/or resin layer. For good adhesion between the refrigerant barrier layer and the other layers, a heating temperature of at least 120° C., and especially 140 to 170° C., is preferred.

The second manufacturing method of the present invention is preferably a method of manufacturing ultra-low permeation hose which includes a lamination step in which the rubber layer and/or the resin layer and the above-described refrigerant barrier layer (laminated film) having an adhesive layer as a surface-forming resin layer are laminated together, and a vulcanization and bonding step in which the laminated rubber layer and/or resin layer and refrigerant barrier layer are heated to at least a temperature at which the adhesive in the adhesive layer reacts and vulcanization and/or reaction of the rubber layer and/or resin layer is effected, thereby causing the refrigerant barrier layer to bond with the rubber layer and/or resin layer.

The above lamination step may involve, for example, laminating together the rubber layer and/or resin layer and the resin layer within the refrigerant barrier layer by spirally or axially winding the adhesive layer-containing laminated film as the outermost layer onto the rubber layer and/or resin layer serving as the innermost layer of the hose.

This lamination step may include also, following lamination of the rubber layer and/or resin layer, the adhesive layer and the resin layer serving as a part of the refrigerant barrier layer, respective steps in which an inner tube outer layer is formed, a rubber composition is optionally extruded, a reinforcing layer is formed from a plurality of organic fibers or metal fibers in a parallel arrangement—either by spirally winding them or by braiding them together, and an outer tube is formed by extrusion.

In the vulcanization and bonding step, the rubber layer and/or resin layer and the refrigerant barrier layer that have been laminated together are heated to at least a temperature at which the adhesive in the adhesive layer that forms the surface of the laminated film reacts and vulcanization and/or reaction of the rubber layer and/or resin layer is effected, thereby causing the refrigerant barrier layer to bond with the rubber layer and/or resin layer.

Accordingly, the vulcanization and bonding step is preferably carried out while heating the above-described refrigerant barrier layer and the rubber layer and/or resin layer to a temperature that is advantageous for vulcanizing the rubber composition making up the rubber layer and/or the resin composition making up the resin layer. It is preferable for the heating temperature to be at least 120° C., and especially 140 to 170° C.

As noted above, the ultra-low permeation hoses of the present invention have an outstanding resistance to refrigerant permeation, particularly to $CO_2$ permeation and heat resistance when $CO_2$ is used as the refrigerant. Moreover, these hoses can flexibly conform to deformation of the hose. The inventive method of manufacturing ultra-low permeation hoses is capable of producing ultra-low permeation hoses endowed with good adhesion between the constituent layers and excellent refrigerant permeation resistance and gas permeation resistance.

EXAMPLES

Examples are given below by way of illustration, although the ultra-low permeation hoses of the present invention are not limited by these examples.

Preparation of Innermost Layer Resin, Inner Tube Rubber Composition and Outer Tube Rubber Composition (1) Innermost Layer Resin Nylon 6 was used as the innermost layer resin.

(2) Inner Tube Rubber (Inner Tube Outer Layer) Composition

The following starting materials were mixed in the weight proportions shown in Table 1 below to form an HNBR rubber composition.

[1] HNBR: Zetpol 2000, produced by Zeon Corporation.

[2] Additives

Carbon black (SRF): Asahi #50, produced by Asahi Carbon Co., Ltd.

Zinc white: Aenka No. 3, produced by Seido Kagaku Kogyo

Stearic acid: LUNAC YA, produced by Kao Corporation

2-Mercaptobenzimidazole: NOCRAC MB, produced by Ouchishinko Chemical Industrial Co., Ltd.

Triallyl isocyanurate: TAIC, produced by Nippon Kasei Chemical Co., Ltd.

Diallyl phthalate monomer: DAP monomer, produced by Daiso Co., Ltd.

Di-tert-butyl peroxyisopropyl benzene: ERKADOX 14, produced by Kayaku Akzo Corporation (3) Outer Tube Rubber (Outer Layer) Composition The following starting materials were mixed in the weight proportions shown in Table 1 below to form an EPDM rubber composition. The carbon black (SRF), zinc white and stearic acid were the same as those used above in the inner tube rubber composition.

[1] EPDM: Mitsui EPT 4070, produced by Mitsui Chemicals, Inc.

[2] Additives

Paraffin oil: Machine Oil 22, produced by Showa Shell Sekiyu K.K.

Sulfur: Powdered sulfur produced by Karuizawa Seirensyo

TT: Sanseler TT-PO, produced by Sanshin Chemical Industry Co., Ltd.

CZ: Sanseler CM-PO, produced by Sanshin Chemical Industry Co., Ltd.

TABLE 1

|  | Inner tube rubber composition | Outer tube rubber composition |
|---|---|---|
| HNBR | 100 |  |
| EPDM |  | 100 |
| Carbon black (SRF) | 95 | 90 |
| Zinc white | 2 | 5 |
| Stearic acid | 1 | 1 |
| 2-Mercaptobenzimidazole | 1 |  |
| Triallyl isocyanurate | 3 |  |
| Diallyl phthalate monomer | 7 |  |
| Di-tert-butyl peroxyisopropyl benzene | 3 |  |
| Paraffin oil |  | 30 |
| Sulfur |  | 1 |
| TT |  | 2 |
| CZ |  | 1 |

Preparation of Laminated Film A

A polyamide-epoxy reactive adhesive (ARON MIGHTY BX-60, produced by Toagosei Co., Ltd.) was applied to each side of a 7 μm thick aluminum foil to a thickness of 10 μm. An oriented nylon film was then placed as a strength-retaining layer on top of each adhesive layer to a thickness of 15 μm, thereby giving a laminated film having an elongation at break of 32% (laminated film A).

Preparation of Laminated Film B

A polyester adhesive (a two-part reactive adhesive composed of the heat-resistant polyester resin AD-335A as the base resin and the isocyanate CAT-10 as the hardener; produced by Toyo-Morton Co., Ltd.) was applied to each side of a 7 μm thick aluminum foil to a thickness of 10 μm. An oriented nylon film was then placed as a strength-retaining layers on top of each adhesive layer to a thickness of 15 μm, thereby giving a laminated film having an elongation at break of 30% (laminated film B).

Preparation of Laminated Film C

A urethane adhesive (a two-part reactive adhesive composed of the polyurethane resin Takelac A-515 as the base resin and the isocyanate A-3 as the hardener; produced by Takeda Chemical Industries, Ltd.) was applied to each side of a 7 μm thick aluminum foil to a thickness of 10 μm. An oriented nylon film was then placed as a strength-retaining layer on top of each adhesive layer to a thickness of 15 μm, thereby giving a laminated film having an elongation at break of 30% (laminated film C).

The elongation at break of each of the laminated films was measured by cutting a dumbbell-shaped test piece (dumbbell No. 3 shape) from the above laminated films A, B and C in accordance with JIS-K6251-1993, carrying out a tensile test in accordance with JIS-K7113-1995 on each test piece, and observing the test piece under an optical microscope at a magnification of 50×until cracks formed in the aluminum foil. The elongation of the test piece at the time that cracks were observed was treated as the elongation at break.

Ultra-Low Permeation Hose

Example 1

The nylon 6 serving as the innermost layer resin was extruded about the outer periphery of a 6 mm diameter mandrel from an extruder having a crosshead die for resin, thereby forming an innermost layer having a thickness of 0.2 mm. A phenolic adhesive was then applied to the extruded resin layer and the laminated film A was spirally wound in a half-wrap arrangement—that is, so that each turn of the film overlapped the underlying turn by one-half of the film width—on top while applying phenolic adhesive thereto, in this way forming a refrigerant barrier layer having a thickness of 0.2 mm.

The HNBR rubber composition serving as the inner tube rubber composition was then extruded over the refrigerant barrier layer using an extruder having a crosshead die for rubber, thereby forming an inner tube outer layer having a thickness of 1.6 mm. A reinforcement made of aramid yarn was braided (1500 d, 80 yarns) over the inner tube outer layer so as to form a reinforcing layer. The EPDM rubber composition serving as the outer tube rubber composition was then extruded over the reinforcing layer using an extruder having a crosshead die for rubber, yielding an outer layer having a thickness of 1.2 mm.

The rubber was then vulcanized at 150° C., following which the mandrel was removed, giving an ultra-low permeation hose A according to the present invention.

Comparative Example 1

Aside from using above laminated film B as the refrigerant barrier layer, an ultra-low permeation hose B was produced in the same way as in Example 1.

Comparative Example 2

Aside from using above laminated film C as the refrigerant barrier layer, an ultra-low permeation hose C was produced in the same way as in Example 1.

Refrigerant Permeation Resistance Test

Tests of the refrigerant permeation resistance were performed on ultra-low permeation hoses A to C obtained as described above. These tests were carried out using the hydrofluorocarbon R134a and $CO_2$ as the refrigerants. The method and apparatus described in JP 2001-349801 A for measuring the amount of gas permeation in a hose were used.

That is, in each case, two 50 cm long hoses (ultra-low permeation hose A, B or C) of the type being tested with fixtures attached at both ends were prepared. The hoses were first heated at 70° C. for 4 hours, following which one hose was connected to a reservoir tank and filled with refrigerant at 20° C. to a pressure of 5.5 MPa. The other hose was sealed without being filled with refrigerant. After holding both hoses at 120° C. for 72 hours, their weights were measured, the amount of gas permeation was calculated, and the resistances to permeation by R134a and supercritical $CO_2$ were determined. The results are presented in Table 2 below.

Adhesion Test

The ultra-low permeation hoses A to C were tested as described below to determine the adhesive properties of the laminated film in each following immersion of the hose in supercritical $CO_2$.

The adhesion test was carried out in general accordance with JIS-K6330-6-1998. That is, 10 cm wide test strips (type 4) taken from each hose were subjected to peel tests in a normal temperature atmosphere using a tensile testing machine equipped with a constant-temperature chamber. The results are shown in Table 2.

Heat Resistance Test

The heat resistances of above ultra-low permeation hoses A to C were measured by heating 10 mm wide test strips (type 4) taken from each hose to 150° C., then subjecting the strips to the adhesion test described above. The results are shown in Table 2.

TABLE 2

| | Comparative Example 1 | Comparative Example 2 | Example 1 |
|---|---|---|---|
| Supercritical $CO_2$ permeation resistance (g/m/72 h) | 6.9 | 8.2 | 0.4 |
| HFC (R134a) permeation resistance (g/m/72 h) | 0.1 | 0.1 | 0.1 |
| Laminated film after immersion in supercritical $CO_2$ | delaminated | delaminated | no delamination |
| Laminated film after heating at 150° C. | delaminated | delaminated | no delamination |

It is apparent from the results shown in Table 2 that ultra-low permeation hoses A to C all had permeation resistance to R134a. However, with regard to the resistance to permeation by supercritical $CO_2$, the amount of permeation by supercritical $CO_2$ was larger in both ultra-low permeation hoses B and C. By contrast, ultra-low permeation hose A according to the present invention was permeated by only a very small amount of supercritical $CO_2$, indicating that it had a good resistance to supercritical $CO_2$ permeation. In the adhesion test, the laminated film in ultra-low permeation hose A did not delaminate even after immersion in supercritical $CO_2$. Likewise, in the heat-resistance test, the laminated film in ultra-low permeation hose A did not delaminate even after exposure to an elevated temperature (150° C.).

Although some preferred embodiments have been described, many modifications and variations may be made thereto in light of the above teachings. It is therefore to be understood that the present invention may be practiced otherwise than as specifically described without departing from the scope of the appended claims.

This application claims priority on Japanese patent application No. 2002-255099, the contents of which are hereby incorporated by reference.

What is claimed is:

1. An ultra-low permeation hose having at least a refrigerant barrier layer and a rubber layer and/or a resin layer; wherein the refrigerant barrier layer is a laminated film comprising a resin layer and, on the outside thereof, a metal layer, which the resin layer and the metal layer are bonded together by a polyamide-epoxy reactive adhesive.

2. An ultra-low permeation hose having at least a refrigerant barrier layer and a rubber layer and/or a resin layer; wherein the refrigerant barrier layer is a laminated film composed of at least a metal layer laminated between two resin layers, and at least the inside resin layer of the two resin layers is bonded with the metal layer by a polyamide-epoxy reactive adhesive.

3. The ultra-low permeation hose according to claim 1, wherein the laminated film has an elongation at break of at least 10%.

4. The ultra-low permeation hose according to claim 2, wherein the laminated film has an elongation at break of at least 10%.

5. The ultra-low permeation hose according to claim 1, wherein the metal layer is a metal foil.

6. The ultra-low permeation hose according to claim 2, wherein the metal layer is a metal foil.

7. The ultra-low permeation hose according to claim 1, wherein the resin layer has a strength-retaining layer.

8. The ultra-low permeation hose according to claim 2, wherein the resin layer has a strength-retaining layer.

9. The ultra-low permeation hose according to claim 7, wherein the strength-retaining layer is made of a polyamide resin composition, a polyester resin composition, a polyvinyl alcohol resin composition, a polyimide resin composition or a fluorocarbon resin composition.

10. The ultra-low permeation hose according to claim 8, wherein the strength-retaining layer is made of a polyamide resin composition, a polyester resin composition, a polyvinyl alcohol resin composition, a polyimide resin composition or a fluorocarbon resin composition.

11. The ultra-low permeation hose according to claim 7, wherein the strength-retaining layer is the innermost resin layer, and the strength-retaining layer and the metal layer are bonded together by a polyamide-epoxy reactive adhesive.

12. The ultra-low permeation hose according to claim 8, wherein the strength-retaining layer is the innermost resin layer, and the strength-retaining layer and the metal layer are bonded together by a polyamide-epoxy reactive adhesive.

* * * * *